US006829350B1

(12) United States Patent
Trinkel et al.

(10) Patent No.: US 6,829,350 B1
(45) Date of Patent: Dec. 7, 2004

(54) METHOD FOR OPERATING A GLOBAL, VIRTUAL CALL CENTER

(75) Inventors: Marian Trinkel, Huertgenwald (DE); Christel Mueller, Schulzendorf (DE); Fred Runge, Wuensdorf (DE); Thomas Ziem, Zepernick (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/720,630

(22) PCT Filed: Apr. 30, 1999

(86) PCT No.: PCT/EP99/02953

§ 371 (c)(1),
(2), (4) Date: Dec. 22, 2000

(87) PCT Pub. No.: WO99/67939

PCT Pub. Date: Dec. 29, 1999

(30) Foreign Application Priority Data

Jun. 24, 1998 (DE) ........................................ 198 30 007

(51) Int. Cl.[7] .............................................. H04M 3/00
(52) U.S. Cl. .............................. 379/265.09; 379/265.01
(58) Field of Search ....................... 379/265.01, 265.02, 379/265.09, 266.1

(56) References Cited

U.S. PATENT DOCUMENTS

| 5,506,894 A | | 4/1996 | Billings et al. | ......... | 379/127.01 |
| 5,848,143 A | * | 12/1998 | Andrews et al. | ....... | 379/265.09 |
| 6,134,318 A | * | 10/2000 | O'Neil | .................. | 379/266.01 |

FOREIGN PATENT DOCUMENTS

| DE | 196 24 987 | 1/1998 |
| EP | 0 660 573 | 6/1985 |
| EP | 0 740 445 | 10/1996 |
| EP | 0 753 956 | 1/1997 |
| EP | 0 814 591 | 12/1997 |
| JP | 61169060 | 7/1986 |
| WO | WO 97/24862 | 7/1997 |
| WO | WO 98/25417 | 6/1998 |

OTHER PUBLICATIONS

Paris, G. et al., "The Next Generation Call Center," Telcom Report International, vol. 19, No. 4, Jan. 1, 1996, pp. 9–11.
Dresner, S., "Just Pick Up Your Computer and Dial," Communication News, Feb. 1, 1998, pp. 42–43.
Cray, A., "Major Hassles, Major Payoffs," Data Communications, vol. 26, No. 13, Oct. 1, 1997, pp. 127–130, 132, 134, 135.
Silling, J., "CTI, Piece by Piece," Byte, vol. 22, No. 2, Feb. 1, 1997, pp. 85–88.

* cited by examiner

Primary Examiner—Ahmad F. Matar
Assistant Examiner—Quynh H Nguyen
(74) Attorney, Agent, or Firm—Kenyon & Kenyon

(57) ABSTRACT

In a method for operating a global, virtual a call center having operators working all over the world, in response to a call from a customer, data suitable for identifying the customer and allocating him or her to a customer group are collected and stored. These data are compared using a search routine to stored data of the operators logged on for the call center. As a result, the customer is automatically connected by the call center server to the web browser of the workstation system of the operator selected for the customer, at the same time all of the data collected for the customer being displayed on the web browser window of the operator's monitor. For international call centers, in particular, the method improves communication between the customer and the operator.

10 Claims, 1 Drawing Sheet

METHOD FOR OPERATING A GLOBAL, VIRTUAL CALL CENTER

FIELD OF THE INVENTION

The present invention relates to a method for operating a global, virtual call center in accordance with Claim 1.

REDACTED TECHNOLOGY

Call centers are geared to services which are handled by operators/agents. The caller/customer is offered voice and/or data services within the framework of the services of the call center.

These types of process are mostly handled via a central telephone server system. Customers are routed to an operator via a call center system. The operator is connected by telephone to the customer and is available to the customer for the desired service.

A call center for the Internet (ICC) was put into operation by the firm Sitel Corporation and Lucent Technologies. It offers both voice and data via one analog telephone line (see Handlesblatt, Tuesday, Jan. 27, 1998, Hamburg "Call-Center fürs Internet" [Call Centers for the Internet]). In this context, the target groups are, in particular, the airlines, travel agencies, banks and insurance companies. In the case of the ICC, a customer clicks on a web site in the Internet to initiate a dialog with a call center employee (operator).

Silling J., "CTI, PIECE BY PIECE", byte, vol. 22, no. 2 of Feb. 1, 1997, pp. 85–88, describes an approach where an automatic call number identification (ANI) is accessed for incoming connections. If there is an incoming call at a company, the automatic call distribution or the private branch exchange extracts the ANI data, combines them with an internal extension, and transmits the caller information to a CTI server. The CTI server compares the caller identifier and the extension to its database in order to find the correct PC. The CTI server then creates a data record and sends it to a customer database. This data record requires that the customer information belonging to the caller's call number be routed to the appropriate PC in the company.

Cray, "Major Hassles, Major Payoffs", Data Communications, vol. 26, no. 3, October 1997, pages 127–130, describes a conventional call center is where hundreds equipped with headsets are connected to a private branch exchange, to which an automatic call distribution (ACD) belongs. An interactive voice-response device (IVR) retrieves a recorded announcement, which prompts the customer to use the telephone keypad to enter precise information on his or her call. The ACD retrieves the customer's information and uses it to select an appropriate call center agent to process the call. The customer is then serviced by this call center agent.

European Patent Document No. EP-A-0 753 956 describes an approach which is based on a company's own network (wide area network). In this approach, the customer's connection is likewise established via the ANI. A host computer has an archive database containing customer data. The customer data are made available to the call center agents. The call center agent can retrieve the customer's data and request new customer data.

Dresner, S., "Just pick up your computer and dial", Communications News, February 1998, pp. 24–43, describes how to set up communications via Internet telephony within the framework of a call center.

In the known call centers, communication between the servers and the operator workstations is established via LAN connections.

The disadvantage of such networks is that they are not very flexible due to their network structure. Also, due to the need to be constantly connected, they entail high connection costs, particularly in the case of international call centers.

When call centers are operated on an international basis, both the operators as well as the customers can reside all over the world and, thus, belong to different linguistic groups. Communication difficulties can arise, in particular between the operators and customers.

Another drawback is that when an operator switches through a customer via the server, he or she usually does not have any information on the customer that could be used to clearly identify the customer. This is especially problematic when it comes to invoicing the customer for services, since the employees of the call center working as operators, who ultimately process the services for the customers, can work in a different country than the customer, particularly in the case of international call centers.

SUMMARY OF THE INVENTION

The object underlying the present invention is to devise a method which will make it possible to operate a call center having operators working all over the world, who are provided with Internet access, PCs with operating systems, conventional web browsers, as well as with communications terminals, and which will enable the connection to be set up from the customer to the operator in accordance with the rules defined in the call center. In the process, the aim is to facilitate the dialog between the customer and the operator, and improve the legal security of the international invoicing process in the service area between the company operating the call center, the operators working for the call center, and the customer.

The present invention provides a method for operating a global call center in which in response to a call from a customer, once the connection between the customer and the call center server is established, specific data are automatically collected for identifying the customer and assigning him or her to a customer group. In the context of the present invention, specific data are understood to be data which make it possible to locally identify the communication terminal and/or to identify the person placing the call for the customer, or to allocate the subscriber terminal to a linguistic group or to another customer group.

In accordance with the present invention, once the connection is established, data are collected, which are useful for identifying the customer making the call. These data include, for example, the identifier of the communication terminal of the customer making the call. The terminal identifier can be used to identify and allocate the terminal of the customer placing the call.

In a further step, the customer's data are compared to the data of the operators logged on for the call center. This is done by way of a control installation designed as a search routine. The criterion for the comparison can be, for example, a shared language or a specialized field underlying the customer's query. The result of the comparison described on the above basis is used as baseline information for assigning an appropriate operator to the customer. This search is likewise carried out on the basis of a program in the call center server. When an appropriate operator is found, a connection is established from the call center server to the web browser of the selected operator.

BRIEF DESCRIPTION OF THE DRAWINGS

The method in accordance with the present invention elaborated upon below with reference to the drawing, in which.

DETAILED DESCRIPTION

Figure 1:
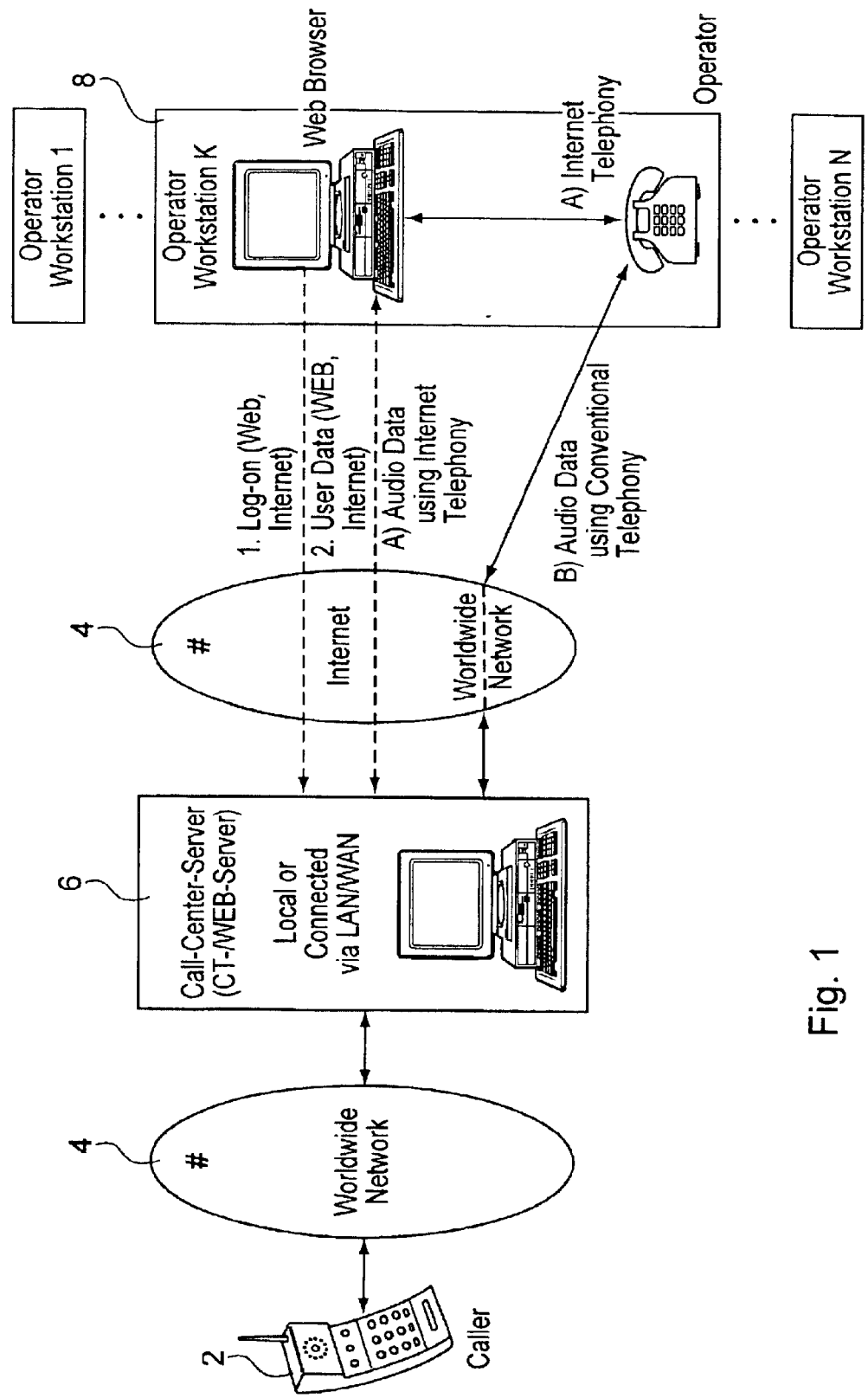
FIG. 1 shows the set-up of a connection from a call center server connected to the Internet to an operator logged on internationally via the WWW (world wide web) for transmitting voice and/or images, as well as data information within the framework of a call center.

In accordance with FIG. 1, at the core of the call center is a web server 6 that is connected to the Internet. In the present specific embodiment, a web server having HTTP is activated as a data server, which is connected to a telephony server (CT server). This configuration can be used to set up both conventional telephone connections, as well as Internet telephony connections. The advantage provided by selecting the web server is that the operator can use a standard web browser, such as Netscape Microsoft Explorer or Netscape Navigator, for the connection between the web server and the operator. This eliminates the need for the special display mechanisms used in known methods heretofore for call centers. In the specific embodiment according to FIG. 1, the web browser is assigned to the operator's workstation system 8.

The method in accordance with the present invention is elucidated on the basis of an exemplary embodiment whose starting point is a call from a customer at the call center. Via his or her communication terminal, a customer (caller) 2 calls up a service defined in the CT/web server. Once the communication connection is established between the customer and the server, the identity of the customer placing the call is determined and stored by the call center, for example via the terminal identifier CLI (calling line identification) or ANI. It is even possible for the call center server to actively establish a connection to a customer on the basis of stored rules or in response to a customer request. One can draw upon the thus acquired data as basic data to search for an appropriate operator for this customer. For this purpose, on the basis of a search program stored in the call center server, the data for identifying the customer are compared to the data of the operators working for the call center, as stored in the call center system. Once an appropriate group of operators is established for the customer, an operator is selected on the basis of other rules and criteria stored in the call server. The search program compares the customer identification data gathered to the operator data from the group of operators selected already in the first search step. In this context, appropriate search rules, stored in the form of search routines, are applied in carrying out the search for a suitable operator for the customer.

Prior to execution of the search routine, a determination is made as to which one of the operators from the selected group is currently ready and available to assist a new customer. The rules can be conceived, for example, as search routines of the call center server, which contain defined instructions as discriminating criteria. The simplest instruction would be to select the first available operator from the established group of operators and to connect him or her to the customer.

At this point, however, one could check other criteria to tailor the operator selection even more specifically to the customer. As an example, one could check to determine which operator from the selected group is suited for fulfilling the customer's request.

However, a prerequisite for such a search routine is that the customer has already been queried about the service desired via a dialog system. To select the language used by the dialog system to communicate with the customer, the existing assignment of the customer to a linguistic group is used or other available data are retrieved from the network.

If an intelligible communication does not come about, especially because the customer is not able to be assigned to the linguistic group specified by the terminal identifier for the telecommunication terminal used, the system then checks which language the customer speaks based on verbal utterances, or by performing a selected interrogation on the basis of a language-supported search algorithm. It is beneficial, in this connection, to query the customer in his or her mother tongue about the desired service via the conversational dialog system. If a situation of this kind is ascertained, the results of the previous search for a suitable operator are discarded, and a new search for suitable operators is begun again on the basis of information pertaining to the customer's language.

Once the customer has been queried, a search routine may be run to check which one of the operators from the group of operators just selected processes the particular topic group to which the service desired by the customer is assigned.

Once the most suitable operator for the customer is determined, the call center server establishes an audio communication via the telecommunications network to the selected operator and switches through to the customer. The telecommunications connection between the call center server and the customer placing the call can be optionally set up via the existing telephone network 4, as well as via the Internet or other networks.

The means that the connection can be established, for example, as an audio connection B using conventional telephony, or as an audio connection A via Internet telephony, as illustrated in FIG. 1. All that is required for the operator, besides a suitable PC, is a web browser for presenting call-specific data, as well as an Internet-telephony device or a telephone terminal. At the time the customer's call comes into the operator via the call center server, the present invention provides for all data on the customer placing the call that were already collected in the preceding steps via the call center server, such as call number and specifics pertaining to the requested service, to be displayed in the web browser window on the monitor at the operator's workstation. These data are supplemented or provided in greater detail in the operator's conversational communication with the customer.

During the time of the audio communication between the customer and the operator, the operator remains connected with the Internet in order to initiate or to provide the service desired by the customer.

Upon conclusion of the communication with the customer, the audio communication between the CT server and the operator is terminated. The operator is then ready to receive the call from another customer. The virtual connection to the web server is retained until the operator logs off.

In another embodiment according to the method of the present invention an operator having a central switching function is automatically dialed once the connection is established between the customer and the call center server. In such a case, the terminal identifier of the customer placing the call is likewise put through to the central operator. The process sequence described above is carried out via the central operator.

What is claimed is:

1. A method for operating a global virtual call center, the method comprising:

in response to a call from a customer using a communication terminal, establishing a connection between the customer and a call center server and collecting data useable for a local identifying of the communication terminal;

storing the collected data;

comparing the collected data to respective stored data of a plurality operators logged on for the call center using a search routine including a discrimination system so as to select an operator of the plurality of operators;

making the collected data available for transmission to the selected operator;

displaying the collected data on a window of a web browser of the selected operator;

automatically establishing a virtual connection via a packet-oriented data network to the web browser of the selected operator using a server of the call center;

supplementing the collected data displayed on the web browser window of the selected operator based on a conversational dialog between the selected operator and the customer;

transmitting the supplemented data to the call center server; and centrally storing the transmitted supplemented data.

2. The method as recited in claim 1 wherein the establishing the connection is performed in accordance with at least one of an allocation to a linguistic group and an allocation to a customer group.

3. The method as recited in claim 1 wherein the collected data includes at least one of a call number, information on the customer, and information on a desired service.

4. The method as recited in claim 1 wherein the local identifying of the communication terminal is performed by recording and analyzing a terminal identifier of the communication terminal.

5. The method as recited in claim 1 further comprising:

in response to the call from the customer, automatically determining at least one of a spoken language of the customer speaks and a request for information by the customer using at least one of language information given by the customer during a greeting and a targeted query using a language-supported search algorithm; and including at least one of the determined language of the customer and the request for information by the customer in the discrimination system for comparing the collected data.

6. The method as recited in claim 1 wherein the call from the customer includes a request for information and further comprising querying the customer about the request for information using a conversational communication system in a language of the customer.

7. The method as recited in claim 1 wherein the connection between the customer and the call center server includes an audio connection over a conventional telephone network.

8. The method as recited in claim 1 wherein the connection between the customer and the call center server includes an audio connection having a packet-oriented protocol.

9. The method as recited in claim 8 wherein the establishing the connection between the customer and the call center server is performed using Internet telephony.

10. A method for operating a global virtual call center, the method comprising:

in response to a call from a customer using a communication terminal, establishing a connection between the customer and a call center server and collecting data useable for a local identifying of the communication terminal;

storing the collected data;

comparing the collected data to respective stored data of a plurality operators logged on for the call center using a search routine including a discrimination system so as to select an operator of the plurality of operators;

making the collected data available for transmission to the selected operator;

displaying the collected data on a window of a web browser of the selected operator;

automatically establishing a virtual connection via a packet-oriented data network to the web browser of the selected operator using a server of the call center;

supplementing the collected data displayed on the web browser window of the selected operator based on a conversational dialog between the selected operator and the customer;

transmitting the supplemented data to the call center server; and centrally storing the transmitted supplemented data, wherein the establishing the connection is performed in accordance with at least one of an allocation to a linguistic group and an allocation to a customer group, and wherein the call from the customer includes:

requesting information, and querying the customer about the request for information using a conversational communication system in a language of the customer.

* * * * *